(12) United States Patent
Morlok et al.

(10) Patent No.: US 11,855,942 B2
(45) Date of Patent: Dec. 26, 2023

(54) ACTIVATION SYSTEM, CONTROL MODULE, AND METHOD FOR OPERATING

(71) Applicant: Robert Bosch GmbH, Stuttgart (DE)

(72) Inventors: Frederik Morlok, Wildberg Gueltlingen (DE); Panagiotis Kosioris, Urbach (DE); Frank Traenkle, Erdmannhausen (DE); Jan Micha Borrmann, Mannheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/841,793

(22) Filed: Jun. 16, 2022

(65) Prior Publication Data
US 2022/0407828 A1 Dec. 22, 2022

(30) Foreign Application Priority Data
Jun. 17, 2021 (DE) ...................... 10 2021 206 175.3

(51) Int. Cl.
*H04L 51/21* (2022.01)
(52) U.S. Cl.
CPC .................................. *H04L 51/21* (2022.05)
(58) Field of Classification Search
None
See application file for complete search history.

(56) References Cited

U.S. PATENT DOCUMENTS

| | | | | |
|---|---|---|---|---|
| 10,887,128 | B2* | 1/2021 | Ando | G07C 5/0808 |
| 2010/0293311 | A1* | 11/2010 | Hahn | H04L 1/24 |
| | | | | 710/107 |
| 2014/0133350 | A1* | 5/2014 | Triess | H04L 9/40 |
| | | | | 370/254 |
| 2019/0020499 | A1* | 1/2019 | Meier | H03M 13/09 |

(Continued)

FOREIGN PATENT DOCUMENTS

DE 102013217595 A1 3/2015

OTHER PUBLICATIONS

ISO 17458-1, "Road Vehicles—Flexray Communications System—Part 1: General Information and Use Case Definition," 2013, pp. 1-12. https://cdn.standards.iteh.ai/samples/59804/9b320403f5404175b488a33d2ed3416e/ISO-17458-1-2013.pdf Downloaded Jun. 9, 2022.

(Continued)

*Primary Examiner* — James A Edwards
(74) *Attorney, Agent, or Firm* — NORTON ROSE FULBRIGHT US LLP; Gerard Messina

(57) ABSTRACT

An activation system for at least one receiving device that is redundantly activatable via a first communication network and via at least one second communication network that is independent of the first communication network. The activation system includes at least two transmitting modules, each of which is designed to generate messages for the receiving device and to transmit them to the receiving device via at least one of the communication networks. At least one transmitting module is connectable to both communication (Continued)

networks, and the transmitting modules are coordinated with one another and/or with the receiving device in such a way that messages from one transmitting module are to be transmitted via a communication network and/or processed by the receiving device with priority over messages from another transmitting module.

12 Claims, 3 Drawing Sheets

(56) References Cited

U.S. PATENT DOCUMENTS

2021/0092018 A1* 3/2021 Fang ................... H04L 47/20
2022/0046114 A1* 2/2022 Entelis ................ H04L 69/08
2022/0385553 A1* 12/2022 Adachi ............... H04L 12/4625

OTHER PUBLICATIONS

ISO 17458-2, "Road Vehicles—Flexray Communications System—Part 2: Data Link Layer Specification," 2013, pp. 1-15. https://cdn.standards.iteh.ai/samples/59806/e4a593c4794f4029963392a47038dde7/ISO-17458-2-2013.pdf Downloaded Jun. 9, 2022.

ISO 17458-4, "Road Vehicles—Flexray Communications System—Part 4: Electrical Physical Layer Specification," 2013, pp. 1-13. https://infostore.saiglobal.com/preview/iso/updates2013/wk5/iso_17458-4-2013.pdf?sku=1609549 Downloaded Jun. 9, 2022.

* cited by examiner

US 11,855,942 B2

ACTIVATION SYSTEM, CONTROL MODULE, AND METHOD FOR OPERATING

CROSS REFERENCE

The present application claims the benefit under 35 U.S.C. § 119 of German Patent Application No. DE 10 2021 206 175.3 filed on Jun. 17, 2021, which is expressly incorporated herein in its entirety.

FIELD

The present invention relates to an activation system, a control unit, and a method for activating at least one receiving device in a safety-critical system, for example an at least semi-automatedly traveling vehicle.

BACKGROUND INFORMATION

Many technical systems are safety-critical in the sense that significant material damage or even personal injury may arise in the event of a malfunction. Systems that control a fully or semi-automatedly traveling vehicle are one example of such.

In these types of control systems, the control units used as well as the communication networks used have a redundant design so that, for example, a vehicle remains controllable even if a control unit or a network line fails. A method is described in German Patent Application No. DE 10 2013 217 595 A1 via which during normal operation the capacity of multiple physical network lines may be bundled to a logical line with high throughput. If one of these physical lines fails, the remaining lines are activated separately from one another in order to maintain the communication with a lower throughput.

SUMMARY

Within the scope of the present invention, an activation system for at least one receiving device is provided. In accordance with an example embodiment of the present invention, the receiving device is redundantly activatable via a first communication network and via at least one second communication network that is independent of the first communication network. The two communication networks may operate according to the same or also different communication standards. For example, the first communication network may be a network with high throughput, via which the receiving device during normal operation is to obtain its messages with priority. The second communication network may, for example, be a network with lower throughput which is used solely as a fallback level. The receiving device may in particular be, for example, an actuator in a control system. The messages may in particular contain, for example, control commands for the actuator.

In accordance with an example embodiment of the present invention, the activation system includes at least two transmitting modules, each of which is designed to generate messages for the receiving device and to transmit them to the receiving device via at least one of the communication networks. At least one transmitting module is connectable to both communication networks. The transmitting modules may, for example, be contained in mutually independent control units, but may also, for example, form different channels in a multichannel control unit.

The transmitting modules are coordinated with one another and/or with the receiving device in such a way that messages from one transmitting module are to be transmitted via a communication network and/or processed by the receiving device with priority over messages from another transmitting module.

It may thus be established, for example, that the receiving device, in response to simultaneously obtaining valid messages from both transmitting modules, responds to the message from the one transmitting module and does not respond to the message from the other transmitting module. This may be established in particular, for example, regardless of via which of the available communication networks the messages arrive in each case at the receiving device. The situation is then somewhat comparable to the command structure on a ship, where commands of the captain are to be obeyed by the crew with priority over commands of other officers, regardless of whether the commands reach the crew in each case via direct calling, via hand signals, or via the loudspeaker system.

The transmitting modules may, for example, be coordinated with one another in such a way that the sending of a message by the one transmitting module via at least one communication network displaces and/or suppresses the sending of a message by the other transmitting module via this communication network. This may be achieved, for example, by sending the messages in the communication networks with appropriately coordinated priorities, or by using an arbitrage mechanism in the particular communication network for simultaneous access to a shared medium. However, messages may also, for example, be marked with their particular sender, so that the receiving device may simultaneously or almost simultaneously allocate received messages to the particular transmitting modules, and may respond to the message coming from the module that transmits with higher priority.

It has been found that the activation system, in particular when one of the communication networks fails, once again reaches a defined state more quickly, and in particular the likelihood is reduced that the receiving device at a certain point in time is uncertain as to which messages originating from multiple transmitting modules, and possibly conflicting messages, it is to respond to.

For such a case, normally in particular activation systems are vulnerable in which the two transmitting modules used, such as control units, are not the same and/or do not operate in exactly the same way. In many activation systems, it is provided that exactly one control unit is dominant, and during normal operation as the primary control unit, as a primary transmitting module it activates an actuator as a receiving device. A further, secondary control unit as a secondary transmitting module is used solely as a fallback level, and is intended to take over the activation of the actuator upon failure of the primary control unit. Frequently, this secondary control unit has a simpler design than the primary control unit, and/or from the outset it is already assigned the role of activating the actuator solely within the scope of a restricted (degraded) operation of the technical system of which it is a part. These restrictions may refer, for example, to a quantitative performance, to performance features, or to an operating period. Thus, for example, for an automatedly traveling vehicle the normal driving operation after the failure of the first control unit may no longer be allowed, since this normal driving operation requires a fallback level, corresponding to the required safety integrity level, which is no longer provided. In contrast, a restricted operation, for example at reduced speed, for a limited operating period or mileage, only on certain types of roads, or only on the way to the nearest repair shop, may also be allowable with only one remaining control unit. However, a situation is undesirable in which the actuator obtains, for example, a first control command that is ascertained for the normal driving operation, and a second control command that is ascertained for the restricted operation, and it is not clearly regulated which control command has priority.

For systems thus far, it is sometimes necessary to set the activated actuator as well as the activation system to the new situation after a failure of a control unit or a network connection. These failover processes often do not run synchronously, since the problem occurs at one end of the communication relationship, and the partner at the other end must first become aware of this before being able to make a failover. Thus, the actuator first notices this, for example, when its connection to the first communication network is terminated, and receives its next control commands to be carried out from its connection to the second communication network. However, if thus far the primary, dominant control unit has fed into the first communication network and the secondary control unit has fed into the second communication network, the failover of the actuator also results in the actuator only listening to the secondary control unit from that moment on. For example, if the secondary control unit now generates control commands for a restricted operation, the actuator suddenly obtains commands that are completely qualitatively different than prior to the failure of the network connection, although the primary control unit is still operating properly. These other commands relate to the restricted operation, so that ultimately the "operating quality" of the system including the actuator is reduced.

In contrast, at least one control unit as a transmitting module now feeds into both communication networks from the outset, and it is coordinated that messages from one of the transmitting modules, for example the control unit that is connected to both communication networks, have priority. If, for example, the connection of the actuator to the first communication network now fails, the actuator still obtains its control commands from the first control unit via the second communication network. If this second network provides, for example, a smaller bandwidth than the first network, an information-reduced (compressed, for example) version of the control commands may possibly have to be used. Qualitatively, however, the same action of the actuator is still triggered as prior to the connection failure.

It is thus particularly advantageous that at least the transmitting module whose messages are to be processed with priority by the receiving device is connectable to both communication networks. If both transmitting modules are connectable to both communication networks, after the failure of the primary transmitting module and the change to the secondary transmitting module, there is still redundancy with regard to the transfer to the receiving device. This means that the receiving device then still obtains messages from the secondary transmitting module when the connection via one of the two communication networks is terminated.

As explained above, the role of activating the actuator during normal operation of the activation system may be assigned in particular to a primary control unit, for example. In contrast, a secondary control unit may be assigned the role of activating the actuator in the event of an error that deviates from normal operation, when the primary control unit is unavailable. A change between an execution of control commands of the primary control unit and an execution of control commands of the secondary control unit takes place on the part of the actuator only when the primary control unit passes its control commands through to the actuator neither on the first communication network nor on the second communication network. There is a high likelihood that this is the case only when the primary control unit has completely failed.

In a further particularly advantageous example embodiment of the present invention, the activation system also includes at least one third transmitting module that is provided as an additional fallback level for the second transmitting module. This third transmitting module is connectable only to the second communication network. The transmitting modules are now coordinated with one another in such a way that messages sent via the second communication network have highest priority when they originate from the first transmitting module, have medium priority when they originate from the second transmitting module, and have lowest priority when they originate from the third transmitting module.

Apart from the further reduced likelihood that all existing transmitting modules (such as control units) fail at the same time, upon failure of the first transmitting module, greater freedom for further operation is provided to a more or less degraded extent, up to the fully unrestricted functional scope. At least the third transmitting module provides further assistance to the second transmitting module. Thus, in particular for the application in automated driving operation, for example, an even greater functional scope is allowable after the failure of the first control unit.

The first control unit may be configured in such a way that when it senses a failure of the first communication network which initially does not directly affect the functional capability of the first control unit, it changes to a degraded operating mode that is restricted compared to normal operation. The transfer to the receiving device (the actuator, for example) then always starts from the first control unit, but takes place via the second communication network. It may thus be taken into account, for example, that a normal operation with full functional scope presupposes not only intact redundancy with regard to the control units, but also intact redundancy with regard to the communication networks.

In one particularly advantageous embodiment of the present invention, the first communication network is a FlexRay network according to ISO 17458-1 through 17458-5. Such a network allows the actuator to check in a particularly simple manner as to whether the network connection to the first and second transmitting modules is established, and whether both transmitting modules are operationally ready. For this purpose, the various transmitting modules may in each case send messages, in particular for example at predefined positions within FlexRay frames that are actually provided for the particularly fast bidirectional information exchange between devices ("in-cycle control"). In particular, for example static FlexRay frames or static portions of FlexRay frames may be used for this purpose. When the receiving device finds the messages at the corresponding positions in the FlexRay frame, it immediately obtains a complete overview of which of the existing transmitting modules are functional and accessible via the FlexRay network. An actuator as receiving device may then be configured, for example, in such a way that it executes control commands of a primary control unit when the latter reports this in the described manner, and executes control commands of a secondary control unit when only this control unit, but not the first control unit, reports with a message.

The secondary control unit may also optionally respond to a message of the primary control unit in the stated deterministic portion of the FlexRay frame, in which time slots are in turn assigned to the connected devices according to the type of time division multiple access (TDMA): When the primary control unit has reported, it is to be assumed that in the corresponding communication cycle it will also provide the next control command to be executed by the actuator. The secondary control unit may then also listen to the FlexRay bus in order to track its generation of control commands for the fallback level, based on the most current pieces of information exchanged in each case on the bus. However, the secondary control unit does not absolutely have to output these control commands on the FlexRay bus, since the actuator presumably will execute not these control commands, but, rather, the control commands that are sent from the primary control unit, anyway.

Thus, in one particularly advantageous embodiment of the present invention, the transmitting modules are coordinated in such a way that they transmit messages at predefined positions within a FlexRay frame.

In a further particularly advantageous embodiment of the present invention, the second communication network is a controller area network (CAN) bus, such as a CAN FD network, in which the packet size and the data throughput are adaptable. With the so-called bitwise arbitrage, a CAN network provides a function via which both transmitting modules may attempt to send on the shared-medium CAN bus, and only exactly one of these attempts is completed. During the arbitration that is carried out in succession for the bits of the arbitration field, when the secondary transmitting module establishes that the higher-priority primary transmitting module would like to send a message, at this moment it is clear that, for example, an actuator as receiving device will execute a control command contained specifically in this message from the primary transmitting module. The secondary transmitting module may then refrain from attempting to send onto the CAN bus a message containing a control command that will not be executed by the actuator anyway. In contrast, if the first control unit has failed, the second transmitting module wins the arbitration at the simultaneous start of transmission, and with its control command may wait for the actuator without a time delay. In contrast, if both transmitting modules transmit in a time-offset manner, it is up to the receiving device (the actuator, for example) to select, from multiple received valid messages, the one that is to be processed with priority.

The transmitting modules are thus advantageously coordinated to set the arbitration fields to different values in messages sent via the CAN bus.

However, the basic features of the present invention on the one hand of connecting at least one transmitting module to both available communication networks, and on the other hand of establishing a ranking for the messages originating from both transmitting modules, is not limited to communication networks which, like FlexRay or CAN, explicitly provide a functionality that is usable for managing messages having different priorities. Rather, this ranking may also be communicated from the transmitting modules to the receiving device in any other arbitrary manner.

Therefore, in a further advantageous example embodiment of the present invention, the transmitting modules are designed to encode an identification indicating the particular transmitting module, and/or a priority assigned to the particular transmitting module, into a data field, to be evaluated by the receiving device, in the messages sent by the transmitting modules.

The stated basic features of the present invention are not embodied just in an arrangement made up of at least two control units. With even a single control unit, it may be regarded as set up for implementing this basic concept.

Therefore, the present invention further relates to a control unit for at least one actuator that is redundantly activatable via a first communication network and via at least one second communication network that is independent of the first communication network. In accordance with an example embodiment of the present invention, the control unit is connectable to both communication networks, and is designed to ascertain messages, such as control commands, for the actuator and to send them to the actuator via both communication networks. For sending via both communication networks and/or for processing the messages sent via both communication networks, the control unit is designed to claim mutually corresponding priorities.

As explained above, one important application for the activation system and/or control unit described above is the automated driving of vehicles, which depends to a particularly great extent on the reliability. Therefore, the activation system or control unit is advantageously specifically designed to activate an actuator in an at least semi-automatedly traveling vehicle, using messages that represent a trajectory to be traveled by the vehicle.

Moreover, the present invention relates to a method for operating the activation system described above. In accordance with an example embodiment of the present invention, the method begins with the activation system being connected to at least two communication networks. In addition, at least one receiving device, such as an actuator, is likewise connected to these communication networks. The receiving device is then in principle capable of receiving messages, such as control commands, via both communication networks.

In response to at least one valid message that originates from a primary transmitting module of the activation system arriving at the receiving device, this message is processed by the receiving device. In response to no such message, but a valid message that originates from a secondary transmitting module of the activation system, arriving at the receiving device, this message is processed by the receiving device.

In addition, for example messages from the same transmitting module may be received simultaneously or almost simultaneously via both communication networks. For this case, it may be established, for example, that the receiving device preferably processes the message that is received via the first communication network. For example, this first communication network may provide a greater bandwidth for the transfer, so that messages may be transmitted via this first communication network with a higher level of detail and/or at shorter time intervals. The message transmitted via the second communication network may then also optionally be used for plausibility checking, for example.

As explained above, in networks such as FlexRay and CAN there are mechanisms via which a primary, dominant transmitting module may ensure that, during error-free normal operation, a secondary transmitting module that is used only as a fallback level does not even "have one's say" with its own recommendations for messages on the network. Although the secondary transmitting module may continuously ascertain recommendations, it keeps them to itself. However, if the primary transmitting module fails, the stated network-side mechanisms which suppress the transmission of recommendations by the secondary transmitting module immediately stop acting, and the recommendation of the secondary transmitting module is transmitted to the receiving device.

Further measures that enhance the present invention are set forth in greater detail below together with the description of the preferred exemplary embodiments of the present invention, with reference to the figures.

DETAILED DESCRIPTION OF EXAMPLE EMBODIMENTS

Figure 1:
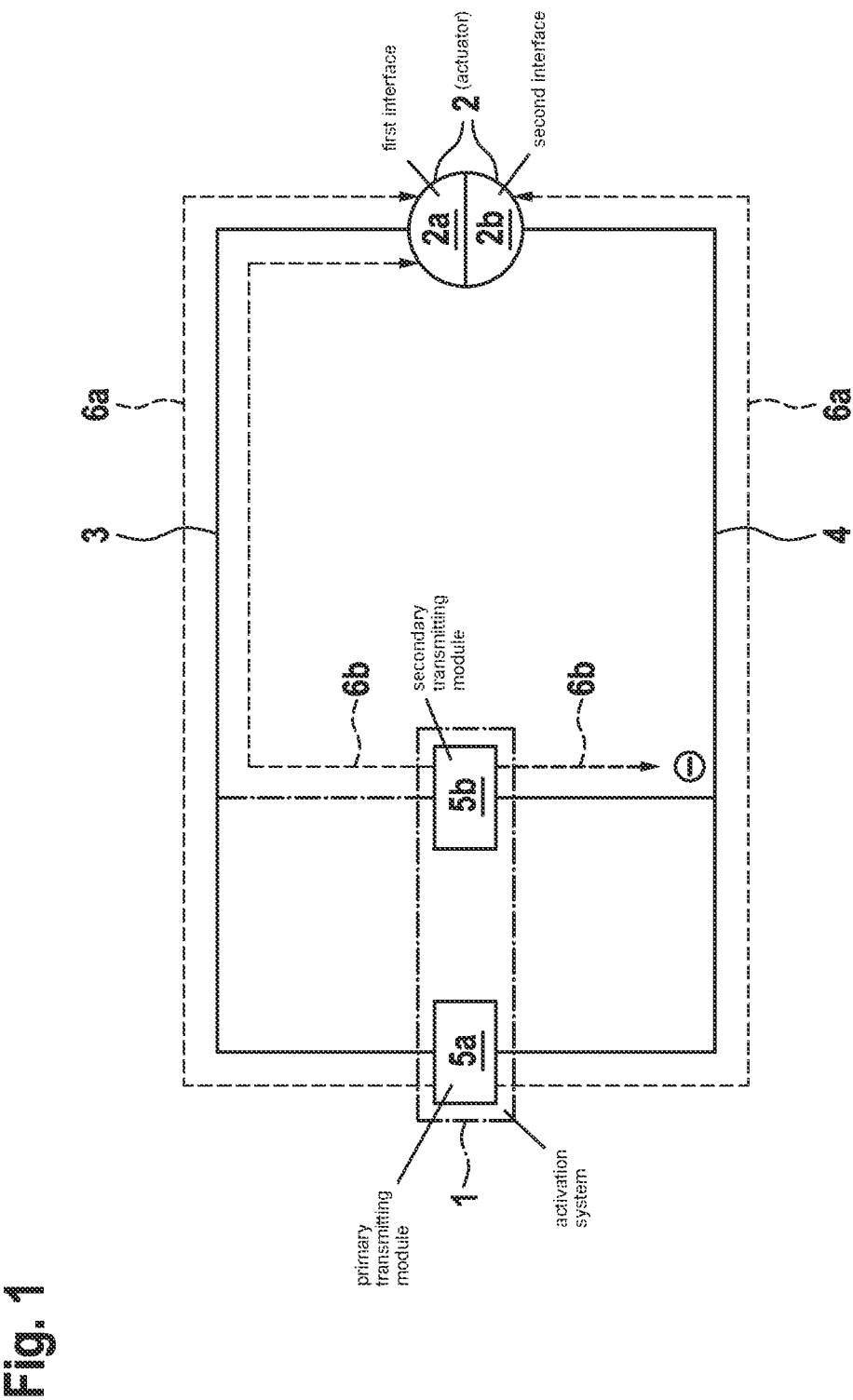
FIG. 1 shows a first exemplary embodiment of activation system 1 including two transmitting modules 5a, 5b, in accordance with the present invention.

FIG. 1 shows a first exemplary embodiment of activation system 1. Two transmitting modules 5a, 5b are provided, which may be, for example, independent control units or also independent channels within the same control unit. In the example shown in FIG. 1, a primary transmitting module 5a is dominant, and during normal operation is intended to send messages 6a, in the present case control commands, to receiving device 2, in the present case an actuator. Secondary transmitting module 5b is used as a fallback level in order to supply receiving device 2 with messages 6b, once again control commands in the present case, within the scope of a degraded operation in the event of a failure of primary transmitting module 5a.

Two communication networks 3, 4 that are independent of one another are available for the communication with receiving device 2. Primary transmitting module 5a is connected to both communication networks 3, 4. In contrast, secondary transmitting module 5b is connected only to second communication network 4. Actuator 2 is connected to first communication network 3 via a first interface 2a, and to second communication network 4 via a second interface 2b.

In the example shown in FIG. 1, network 3 is a FlexRay network and network 4 is a CAN bus. During normal operation, primary transmitting module 5a transmits messages 6a to particular interfaces 2a, 2b of receiving device 2 via both communication networks 3, 4. Secondary transmitting module 5b attempts, simultaneously with primary transmitting module 5a, to transmit messages 6b to interface 2b of receiving device 2 via communication network 4. However, primary transmitting module 5a prevails for the bitwise arbitration on the CAN bus, so that receiving device 2 obtains only messages 6a of primary transmitting module 5a. As explained above, receiving device 2 may be configured in such a way that it preferably processes messages 6a that are obtained via first communication network 3.

Receiving device 2 is thus coordinated with transmitting modules 5a, 5b in such a way that whenever it receives valid messages 6a from primary transmitting module 5a, it processes these messages 6a and possibly ignores additionally arriving messages 6b from secondary transmitting module 5b.

In the state shown in FIG. 1, a failure of first network 3 only results in receiving device 2 from that moment on obtaining control commands 6a of primary control unit 5a via second network 4. However, nothing changes the fact that primary control unit 5a remains dominant.

However, in the event of a failure of primary transmitting module 5a, any valid message 6a of primary transmitting module 5a is absent on the part of receiving device 2. For this case, it is provided that receiving device 2 processes valid messages 6b which it receives from secondary transmitting module 5b.

As indicated by the dotted-line connection, secondary transmitting module 5b may optionally also be connected to first communication network 3, and via same may continually send messages 6b to receiving device 2. However, this does not change the fact that receiving device 2 processes valid messages 6a from primary transmitting module 5a with priority.

Figure 2:
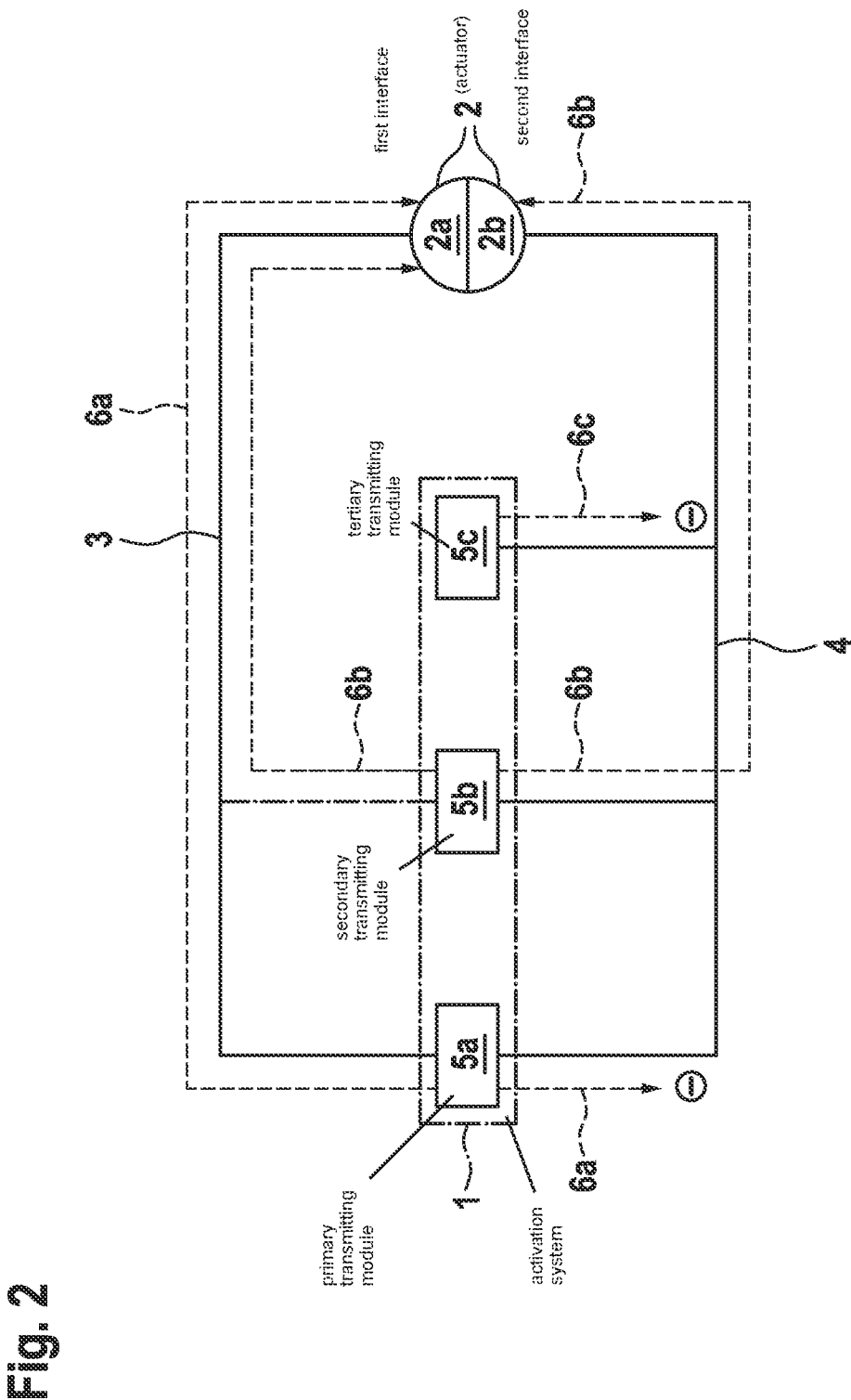
FIG. 2 shows a second exemplary embodiment of activation system 1 including three control units 5a through 5c, in accordance with the present invention.

FIG. 2 shows a further exemplary embodiment of activation system 1. This activation system 1 is connected to receiving device 2 similarly as in FIG. 1. However, in contrast to FIG. 1, a tertiary transmitting module 5c is provided which in comparison to secondary transmitting module 5b is designed to activate actuator 2 within the scope of an even further degraded operation. For an automatedly traveling vehicle, such a further degraded operation may involve, for example, the vehicle immediately stopping while observing traffic regulations, or removing it from the flow of traffic in some other way. Tertiary control unit 5c is connected only to second network 4, not to first network 3.

Receiving device 2 is configured to process
valid messages 6a from primary transmitting module 5a with priority,
next-highest ranking valid messages 6b from secondary transmitting module 5b in the absence of valid messages 6a, and
lastly, valid messages 6c from tertiary transmitting module 6c in the absence also of valid messages 6b.

The bitwise arbitrage in second communication network 4 is controlled in such a way that messages 6a of primary transmitting module 5a are preferably transferred there. Thus, if first communication network 3 fails, this results in the receiving device now obtaining messages 6a from primary transmitting module 5a via second communication network 4.

If primary transmitting module 5a is no longer functioning, valid messages 6b of second transmitting module 5b are next processed by receiving device 2 with priority. Only when second transmitting module 5b is likewise no longer functioning do messages 6c from tertiary transmitting module 5c arrive at receiving device 2. These messages 6c contain control commands for an even further degraded operation. All these transfers run via second communication network 4 after the failure of first communication network 3. If first communication network 3 is restored in the meantime, it is once again used seamlessly.

Figure 3:
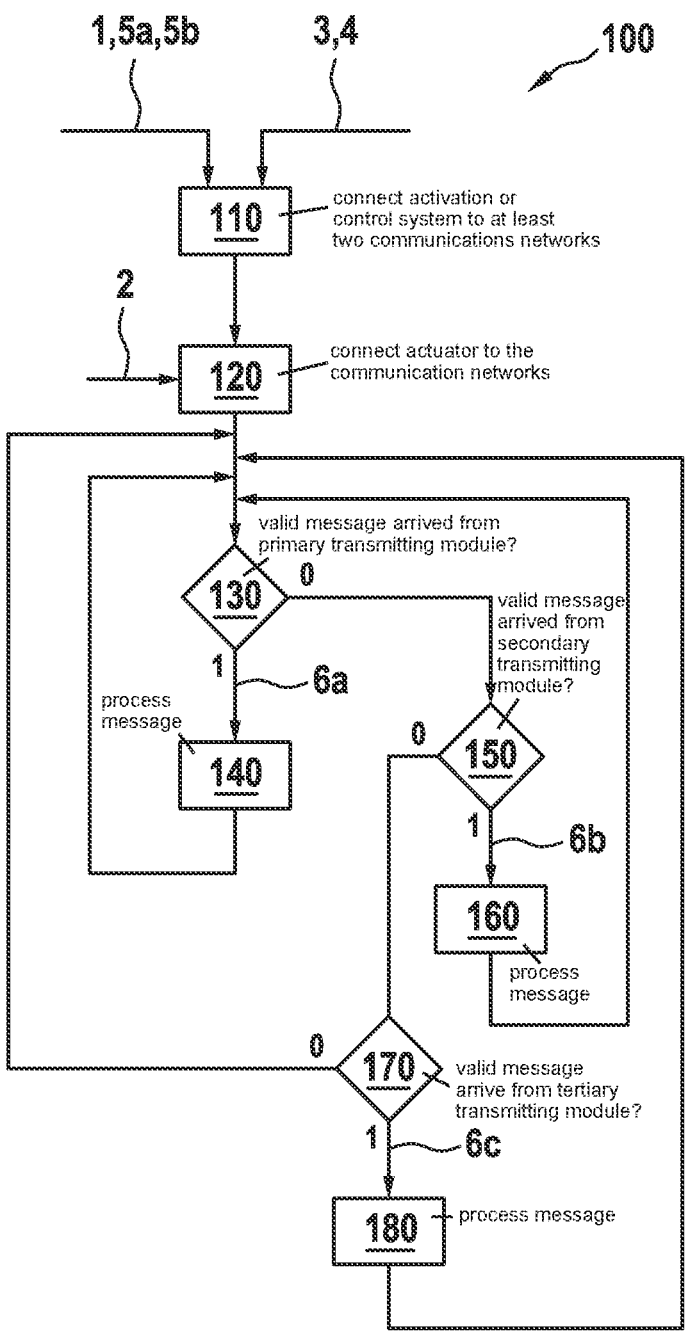
FIG. 3 shows one exemplary embodiment of method 100 for operating activation system 1 or control unit 5a, 5b, in accordance with the present invention.

FIG. 3 is a schematic flowchart of one exemplary embodiment of method 100 for operating activation system 1.

Activation system 1 or control unit 5a, 5b, 5c is connected to at least two communication networks 3, 4 in step 110.

At least one actuator 2 is likewise connected to these communication networks in step 120.

It is checked in step 130 whether at least one valid message 6a originating from a primary transmitting module 5a of activation system 1 arrives at receiving device 2. If this is the case (truth value 1), this message 6a is processed in step 140. However, if no message 6a is present (truth value 0), it is checked in step 150 whether a valid message 6b originating from a secondary transmitting module 5b of activation system 1 is present at receiving device 2. If this is the case (truth value 1), this message is processed in step 160. In contrast, if no valid message 6b is present (truth value 0), it is checked in step 170 whether a valid message 6c originating from a tertiary transmitting module 5c of activation system 1 is present at receiving device 2. If this is the case (truth value 1), this message is processed in step 180.

What is claimed is:

1. An activation system for at least one receiving device that is redundantly activatable via a first communication network and via at least one second communication network, the activation system comprising:
    at least three transmitting modules including a first transmitting module, a second transmitting module, and a third transmitting module, each of the transmitting modules being a hardware transmission device that is configured to generate messages for the receiving device and to transmit the messages to the receiving device via at least one of the communication networks, at least one transmitting module of the transmitting modules being connectable to both the first and the second communication networks, and the transmitting modules being coordinated at least one of (a) with one another and (b) with the receiving device in such a way that messages from one of the transmitting modules are to be at least one of (a) transmitted via a communication network of the first and second communication networks and (b) processed by the receiving device with priority over messages from another of the transmitting modules;
    wherein:
        the first transmitting module of the transmitting modules is assigned a role of activating the receiving device during normal operation of the activation system;
        the second transmitting module of the transmitting modules is assigned a role of activating the receiving device in the event of an error that deviates from normal operation, when the first transmitting module is unavailable;
        the third transmitting module is provided as an additional fallback level for the second transmitting module and is connectable only to the second communication network; and
        the first, second, and third transmitting modules are coordinated with one another in such a way that messages sent via the second communication network:
            have highest priority when they originate from the first transmitting module;
            have medium priority when they originate from the second transmitting module; and
        have lowest priority when they originate from the third transmitting module.

2. The activation system as recited in claim 1, wherein the activation system is configured so that, whenever the first and second transmitting modules are operational without a fault, all messages transmitted from the second transmitting module to the receiving device are ignored by the receiving device.

3. The activation system as recited in claim 1, wherein at least the transmitting module whose messages are to be processed with priority by the receiving device is connectable to both of the first and the second communication networks.

4. The activation system as recited in claim 1, wherein the first communication network is a FlexRay network according to ISO 17458-1 through 17458-5.

5. The activation system as recited in claim 4, wherein the first and second transmitting modules are coordinated in such a way that they transmit messages at predefined positions within a FlexRay frame.

6. The activation system as recited in claim 1, wherein the second communication network is a CAN bus.

7. The activation system as recited in claim 6, wherein the transmitting modules are coordinated to set arbitration fields to different values in messages sent via the CAN bus.

8. The activation system as recited in claim 1, wherein the transmitting modules are configured to encode, in the messages sent by the transmitting modules, at least one of (a) an identification indicating a particular transmitting module and (b) a priority assigned to the particular transmitting module into a data field to be evaluated by the receiving device.

9. The activation system as recited in claim 1, wherein the activation system is configured to activate an actuator in an at least semi-automatedly traveling vehicle, using messages that represent a trajectory to be traveled by the vehicle.

10. The activation system as recited in claim 2, wherein, whenever the first and second transmitting modules are operational without the fault, all of the messages transmitted from the second transmitting module to the receiving device are copies of messages sent from the first transmitting module to the receiving device.

11. A control unit for at least one actuator that is redundantly activatable via a first communication network and via at least one second communication network, wherein:
    the control unit is connectable to both the first and the second communication networks, and is configured to ascertain messages for the actuator and to send the messages generated by a single message generating and transmitting device to the actuator redundantly via both the first and the second communication networks, wherein one of the first and the second communication networks has a higher priority than the other of the first and the second communication networks so that whenever both of the first and second communication networks are operational for transmission of the redundantly sent messages, only those of the messages sent on the one of the first and second communication networks is processed by the actuator with those of the messages sent on the other of the first and second communication networks being ignored.

12. A method for operating an activation system that includes a first transmitting module, a second transmitting module, and a third transmitting module, comprising the following steps:
    connecting the activation system to a first communication network and a second communication network, such that at least one of the transmitting modules is connectable to both the first and the second communication networks;
    connecting at least one receiving device to the communication networks so that the at least one receiving device is redundantly activatable via the first and second communication network, wherein each of the transmitting modules is configured to transmit messages to the receiving device via at least one of the communication networks, the first transmitting module of the transmitting modules is assigned a role of activating the receiving device during normal operation of the activation system, the second transmitting module of the transmitting modules is assigned a role of activating the receiving device in the event of an error that deviates from normal operation, when the first transmitting module is unavailable, and the third transmitting module is provided as an additional fallback level for the second transmitting module and is connectable only to the second communication network; and processing, by the at least one receiving device, messages from the transmitting modules according to respective priorities of the messages, wherein messages sent via the second communication network:

are assigned a highest priority when they originate from the first transmitting module;

are assigned a medium priority when they originate from the second transmitting module; and are assigned a lowest priority when they originate from the third transmitting module.

\* \* \* \* \*